United States Patent [19]

Cook

[11] Patent Number: 4,971,356
[45] Date of Patent: Nov. 20, 1990

[54] PUZZLE WEIGHT FOR BALLAST IN MOTOR VEHICLES

[76] Inventor: Gary D. Cook, 243 W. 14th, Imperial, Nebr. 69033

[21] Appl. No.: 335,737

[22] Filed: Apr. 10, 1989

[51] Int. Cl.⁵ ............................................. B62D 33/04
[52] U.S. Cl. .................................. 280/759; 296/37.6; 296/39.2
[58] Field of Search ............... 280/759, 757; 296/37.6, 296/39.2, 39.1; 114/121, 122

[56] References Cited

U.S. PATENT DOCUMENTS 4,339,142 7/1982 Tannor .................................. 280/759
4,796,914 1/1989 Raynor .................................. 280/759

FOREIGN PATENT DOCUMENTS 0001026 11/1979 PCT Int'l Appl. ................. 280/759

Primary Examiner—David M. Mitchell
Attorney, Agent, or Firm—Charles C. Corbin

[57] ABSTRACT

This invention is puzzle shaped units that preferably are filled with concrete or sand and interlocked in such a way as to form one ballast unit that will lay flat on the floor of a vehicle's normal cargo carrying area. These puzzle shaped units can be arranged in many ways to best fit the cargo space and ballast weight requirements of any vehicle. They are made in such a way and of such a weight that they are easy to take in and out as the need arises.

4 Claims, 2 Drawing Sheets

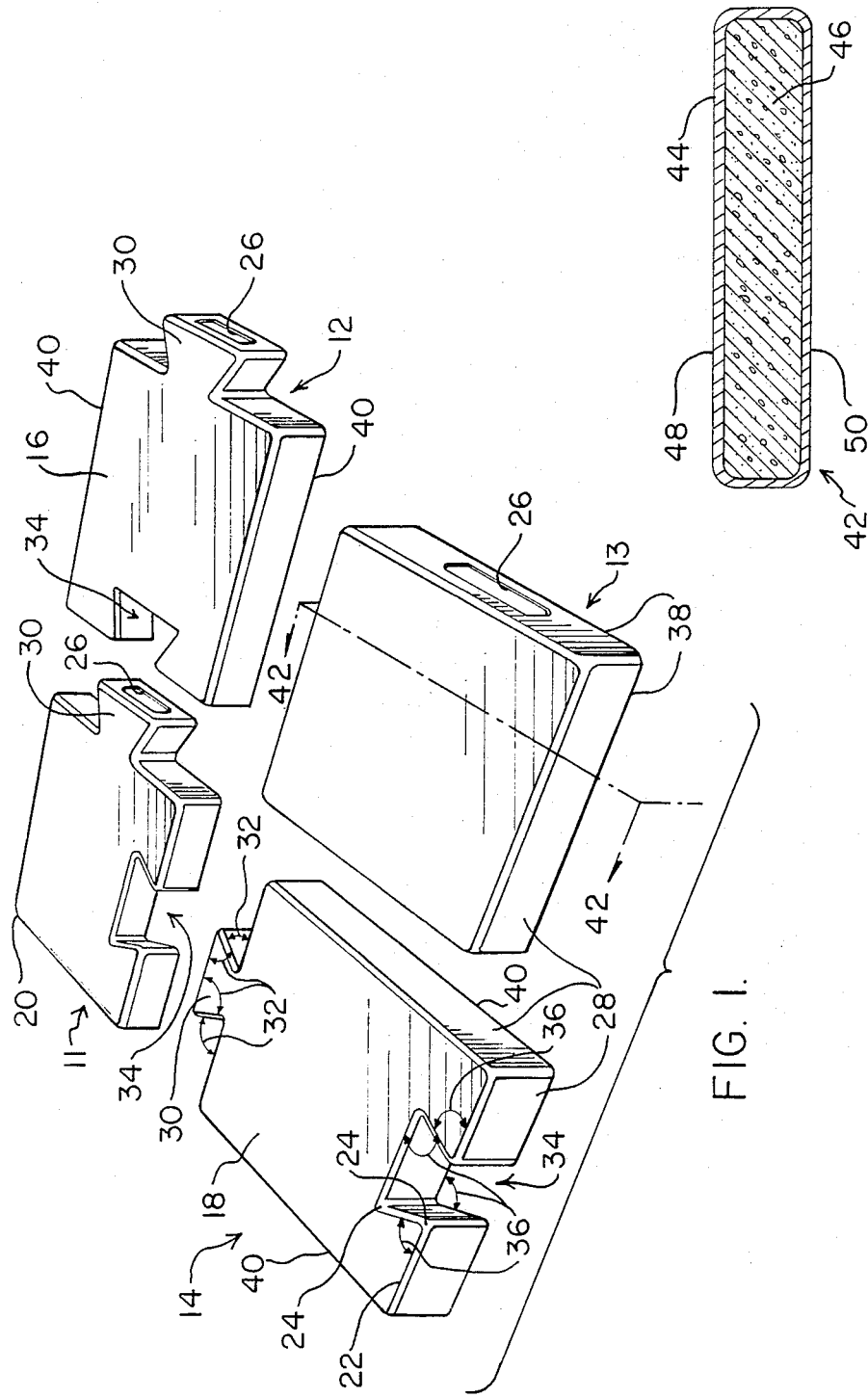

PUZZLE WEIGHT FOR BALLAST IN MOTOR VEHICLES

FIELD OF INVENTION

This invention relates to ballast for but not limited to motor vehicles to facilitate easier handling and better ride on dry roads and better traction in mud and snow

DESCRIPTION OF PRIOR ART

Most users of vehicle ballast prefer something that is not bulky and is out of the way. This facilitates the use of a car trunk or pickup box for what it was made for, hauling loads. They also want to be able to remove such ballast if a need arises to haul heavier loads.

Heretofore the ballast for pickup boxes and car trunks have been confined to loose pieces that slide around when accelerating, braking or turning. Receptacles that hold ballast have also been made that bolt to the sides of pickup boxes.

One such receptacle is comprised of three compartments bolted to each side of pickup. These could be filled with liquid or sand for weight. If the liquid was water it would freeze in winter and burst containers. If the liquid was gas, oil or water mixed with antifreeze and the user wanted to drain this liquid for less weight, other containers would be needed to store it. This would be unhandy and very messy. These receptacles could also be filled with sand but it would be most difficult to take out when not needed. The receptacles would also limit the size of the load capability of the pickup because of their bulk.

Another type of ballast is snapped in and out of brackets bolted to the sides of the pickup. This type of ballast when filled is extremely heavy and hard to handle while removing and putting back in. The brackets are exposed and susceptible to damage with ballast removed. They also don't fit all brands or sizes of pickups.

There is nothing in prior art that I can find that is designed for passenger cars.

Most users, therefore, would find it desirable to have ballast that could be used in all types of vehicles and is easy to take in and out.

OBJECTS AND ADVANTAGES

Accordingly I claim the following as the objects and advantages of the invention: to provide ballast for all types of vehicles, ballast will lay flat on the floor, doesn't take up much room, won't damage a load or luggage by contact, is easy to put in or take out, stores easily when not in use, protects the pickup box or car trunk from damage by the load, can be reversed when showing signs of wear, and is appealing to the eye.

Readers with imagination will find further advantages and an unlimited number of uses from the ensuing description and drawings.

DRAWING FIGURES:

FIG. 1 shows perspective top view of the puzzle weights in an exploded view of one way they could be fitted together.

FIG. 2 shows a sectional view of typical puzzle weight taken along the line 42—42 of FIG. 1.

Figure 3:
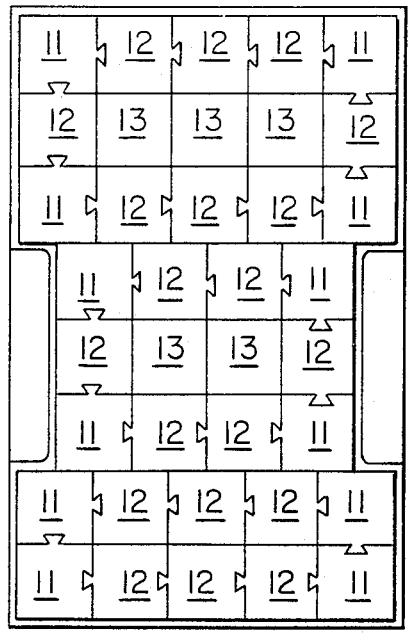
FIG. 3 shows top view of one configuration of puzzle weights in a full sized pickup box.

DRAWING REFERENCE NUMERALS:

11 corner ballast casing
12 side ballast casing
13 filler ballast casing
14 side ballast casing that is the same casing as 12 but is turned over
16 top surface
18 bottom surface
20 typical round corners
22 typical round edges
24 typical rounded angles
26 holes for pouring in ballast
28 flat sides
30 puzzle tabs
32 acute angles
34 puzzle tab insert
36 acute angles
38 sides of embodiment 13
40 sides of embodiments 12 and 14
42 cross section of embodiment 13
44 casing structure
46 concrete filler
48 flat top of casing
50 flat bottom of casing

PUZZLE WEIGHT—DESCRIPTION

FIG. 1 shows perspective top view with weights set apart for the purpose of explanation. FIG. 1 shows four separate embodiments 11, 12, 13 and 14. The corner embodiment 11, side embodiment 12 filler embodiment 13, and side embodiment 14 which is the same as 12 but is shown upside down for clarification.

Each embodiment 11, 12, 13 and 14 is a hollow casing made of plastic or similar material. Each is made in such a way that it can be filled with concrete, sand or similar material and be fitted together to form ballast for vehicles.

Each embodiment 11, 12, 13 and 14 typically has a slip resistant flat surface on top 16 and 48, and bottom 18 and 50, rounded corners 20 and is rounded on all edges 22 and angles 24. They have flat sides 28 all around with designated holes 26 for pouring in ballast and holding plug furnished by others.

Embodiments 11, 12 and 14 each have a typical puzzle tab 30 that is formed by acute angles 32 in such a way that when fitted from the top into the typical puzzle insert 34 that is formed by matching acute angles 36 they will not slide apart when moved forward, backward or laterally.

Figure 5:
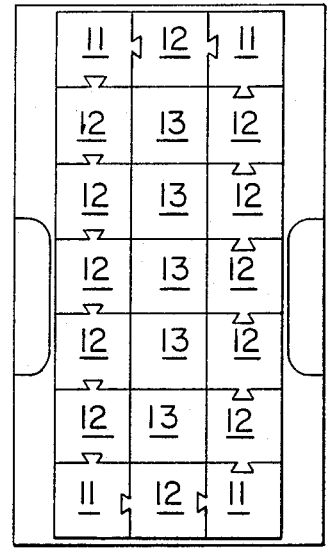
FIG. 5 shows top view of a configuration of puzzle weights in a small pickup box.
Figure 4:
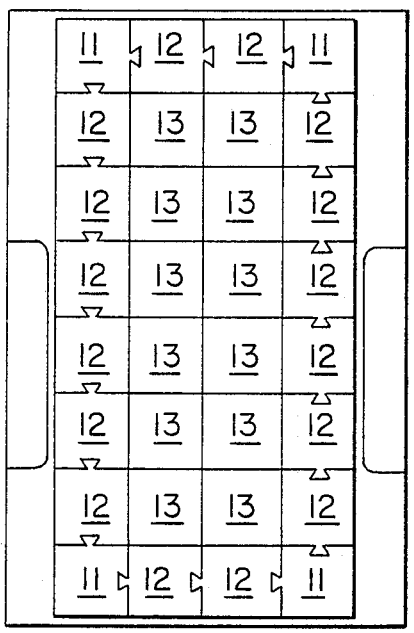
FIG. 4 shows top view of different configuration in a full sized pickup box.
Figure 6:
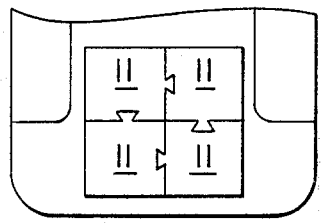
FIG. 6 shows top view of a configuration of puzzle weights in a small car trunk.
Figure 7:
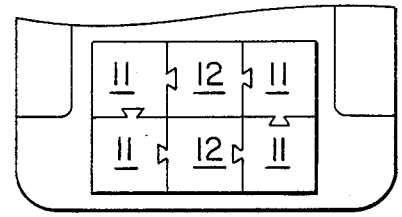
FIG. 7 shows top view of a configuration of puzzle weights in a large car trunk.

Embodiment 13, filler casing, is typically square with all sides 38 of equal length to the typical sides 40 of embodiments 12 and 14 so that it fits into void left when fitting embodiments 11, 12 and 14 together as shown in exploded view in FIG. 1 and in top views in FIGS. 3, 4 and 5.

FIG. 2 shows section 42 of embodiment 13 in FIG. 1 and is typical of the structures of embodiments 11, 12 and 14. Each embodiments 11, 12, 13 and 14 is a completely enclosed casing typically made with a thin polyethelene plastic shell 44 that can be filled with concrete 46, sand or other suitable material for ballast.

PUZZLE WEIGHT—OPERATION AND USES

Embodiments 11, 12 and 13 can be filled with concrete 46, sand or other suitable material through hole 26 made for that purpose. When filling with concrete 46, top 48 and bottom 50 of typical casing need to be braced in such a manner as to keep them from budging out from the weight of the concrete until concrete is set up enough to support itself. When filling with sand or other similar non hardening material some experimenting can be done to determine how full to fill casings 11, 12 and 13 so they will lay flat after plug is installed and they are laid in similar positions as shown in FIGS. 3, 4, 5, 6 and 7.

After filling the number of casings 11, 12 and 13 needed, they can be fitted together in many different ways of which some are shown in FIGS. 3, 4. 5. 6 and 7. In FIGS. 3, 4, 5, 6 and 7 each individual casing is shown by number 11, 12 or 13 in their respective plaCes in the different patterns. To fit Casings together, lay corner casing 11 down flat in one corner of whichever pattern you decide to use. Take another casing, either corner casing 11 or side casing 12 depending again on which pattern you are using, and insert puzzle tab 30 into puzzle tab insert 34 from the top. Proceed in the same manner with each casing until a complete perimeter is formed. If needed fill inside area with appropriate number of filler casing 13. The puzzle tabs 30 when installed in the puzzle tab inserts 34 keep the whole pattern together and help prevent it from sliding around. These patterns of puzzle weights lay flat in the cargo area so vehicle can be used for loads in a regular manner without interference. They are tough enough to hold up under normal use. They have rounded edges so they can be taken in and out with ease. The casing are the same on each respective side so they can be turned over for the same effect.

While the above description contains many specificities, the reader should not construe these as limitations on the scope of the invention, but merely as exemplifications of preferred embodiments thereof. Those skilled in the art will envision many possible variation that are within its scope For example, skilled artisans will readily be able to change the dimensions and shapes of the various embodiments. TheY will be able to make embodiments out of many different materials. They will be able to make the ballast first then cover it with some sort of material and accomplish the same effect. Accordingly the reader is requested to determine the scope of the invention by the appended claims and their legal equivalents, and not by the examples which have been given.

I claim:

1. Ballast used in combination with a pickup truck having a horizontal open, load carrying bed, said ballast including:
   (a) plurality of jigsaw puzzle shaped weighted pieces, each said piece having an outer casing of polymeric material and which casing has a generally flat bottom and is filled with a weighty material, and each said piece having a generally dovetail shaped tenon in one side and a complementary shaped mortise in another side of said piece, and said tenon of each said piece adapted to make locking engagement with a mortise of an adjoining one of said pieces, and said pieces adapted to lay flat on said load carrying bed and to be joined together to form a closed array of a plurality of interlocking pieces wherein the tenon of each of said pieces engages a mortise of an adjoining one of said pieces so as to hold said interlocking pieces against relative lateral movement.

2. Ballast as defined in claim 1 wherein said plurality of puzzle shaped pieces includes pieces that are adapted to be corner pieces for said array, and each said corner piece having a mortise that lies adjacent to a side having a tenon.

3. Ballast as defined in claim 2 including a plurality of generally square-shaped weighted pieces, each having an outer casing of polymeric material which casing is filled with a weighty material.

4. Ballast as defined in claim 3 wherein said puzzle shaped pieces and said generally square-shaped pieces lie in a generally rectangular array with said generally square shaped pieces at the interior of said rectangular array and surrounded by interlocking puzzle shaped pieces.

* * * * *